United States Patent [19]
Brightly

[11] 3,830,455
[45] Aug. 20, 1974

[54] SNOWMOBILE STAND

[76] Inventor: Charles F. Brightly, 3330 S. Cicero Ave., Cicero, Ill. 60650

[22] Filed: May 15, 1972

[21] Appl. No.: 253,552

[52] U.S. Cl. .............................. 248/352, 180/5 R
[51] Int. Cl. ......................................... F16m 11/00
[58] Field of Search........ 248/352, 351, 119 R, 121, 248/13, 137, 97, 163, 146; 180/5 R; 280/47.13, 152 R; 211/22

[56] References Cited
UNITED STATES PATENTS

| | | | |
|---|---|---|---|
| 2,771,304 | 11/1956 | LaPere............................ | 280/152 R |
| 3,605,927 | 9/1971 | Wells................................. | 180/5 R |
| 3,614,041 | 10/1971 | Koger ................................. | 248/97 |

OTHER PUBLICATIONS

Snowmobile Specialties, Inc.; Catalog, page 54, Aug. 1970, Saint Paul, Minn.

*Primary Examiner*—Edward C. Allen
*Attorney, Agent, or Firm*—Hill, Gross, Simpson, Van Santen, Steadman, Chiara & Simpson

[57] ABSTRACT

A support stand for snowmobiles having a base member with an upright support member attached thereto, the upright support member supporting an attachment hook above the base member and a shield positioned on the upright member behind the hook.

3 Claims, 7 Drawing Figures

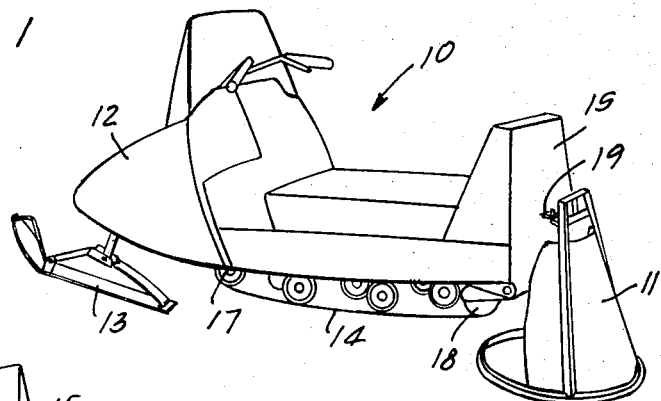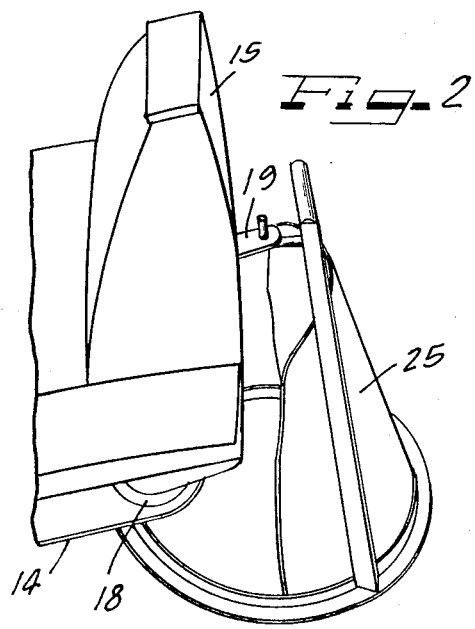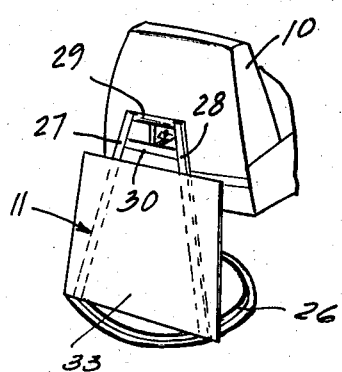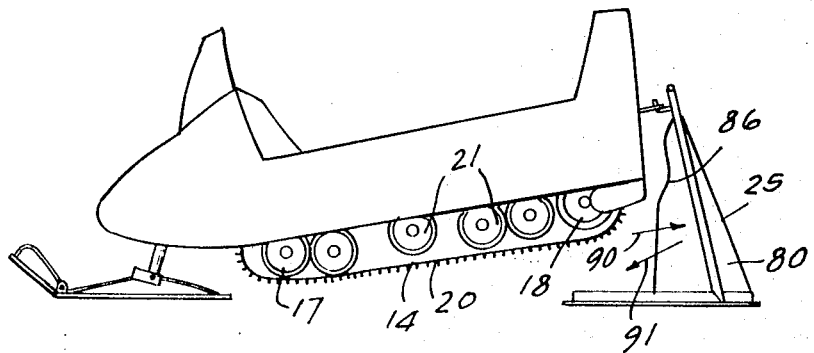

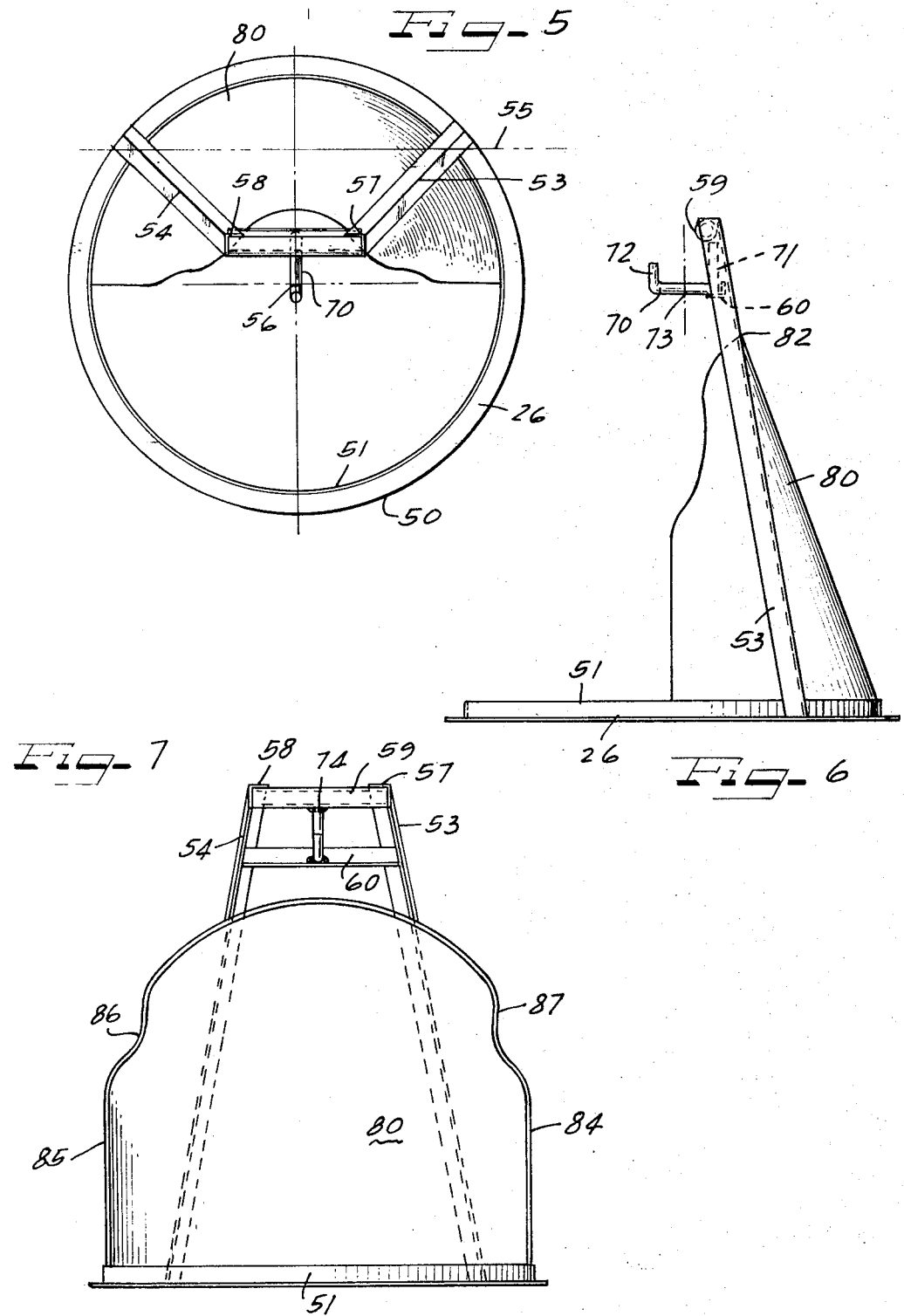

SNOWMOBILE STAND

BACKGROUND OF THE INVENTION

1. Field of the Invention

This invention relates to supports and more particularly to a support stand for a snowmobile.

2. Prior Art

Snowmobiling has become an increasingly popular sport. Additionally, the use of snowmobile vehicles as all-purpose winter transportation vehicles has increased considerably.

The majority of snowmobiles utilize a motor-driven track or endless belt which revolves, in the manner of a conveyor belt, underneath the frame of the snowmobile. This track provides the riding surface for the snowmobile. The track oftentimes must be operated with the snowmobile in a stationary position for adjustment or repair of the track operating mechanism, or of the track itself. Additionally, it is desirable to run the track a short period of time after a period of non-use of the vehicle in order to "run in" the belt. Heretofore, this has required lifting the rear of the snowmobile to elevate the track off of the ground surface. Normally, this is done by simply having one or two persons lift the rear and hold it in an elevated position. Because the track revolves at high speeds, this is dangerous. If the snowmobile should be dropped, it would then be propelled without anybody on it for control.

Additionally, in order to aid the track in biting into the surface of the snow or ground, it is common to put transverse cleats on the belt. It has frequently occurred, in the past, during operation of the track with the snowmobile elevated, that the cleats have become dismounted from the belt. This can be extremely injurious to a person standing at the rear of the snowmobile holding it up.

It is therefore desirable to provide a support device capable of holding the snowmobile in an elevated position with sufficient stability for the track to be run at full speed. Further, the device should be stable on uneven terrain so as to be usable outdoors. Additionally, some means should be provided to prevent injury to bystanders from thrown cleats.

SUMMARY

My invention provides these features in a single support device.

In the preferred embodiment, my support device has a ring base which supports two upright beams, the beams being fastened to the base member at circumferentially spaced points, the spaced points lying on a chordal line. The upright members are angled and terminate in spaced relation at the top. The uprights are fastened together by cross members at the top and the cross members have attached thereto centrally thereof a support hook, the support hook being positioned to support the snowmobile attachment point over the center of the base ring.

Attached to the uprights and to the base member is a shield. The shield extends from adjacent the cross members to the base member, then projects beyond the upright members. The shield is angled with respect to the base member so as to deflect downwardly cleats striking it from the snowmobile. In the preferred embodiment, the shield is curved circumferentially so as to provide an inward direction to thrown cleats.

In one embodiment, the shield is attached to the uprights on the side of the uprights remote from the support hook, while in the preferred embodiment, the shield is attached on the same side as the hook, the shield being curved and projecting between the uprights to the rear portion of the base. In this manner, the uprights act as a further backup to the shield to prevent disassembleability of the shield from the uprights under the striking force of a thrown cleat.

It is therefore an object of this invention to provide a support device for a snowmobile.

It is a further object of this invention to provide a support stand for snowmobiles which has safety features incorporated thereinto.

It is another and more specific object of this invention to provide a support stand for a snowmobile having a base portion supporting a pair of upright portions which in turn support a support hook for attachment to the snowmobile and a shield for deflecting cleats thrown by the snowmobile.

It is a more specific object of this invention to provide a snowmobile stand comprising a circular base portion having angled uprights projecting therefrom, the uprights terminating in cross members supporting a support hook and a shield member attached to the uprights extending from adjacent the cross members to the base.

It is another specific object of this invention to provide a snowmobile stand having a safety shield positionable behind a supported snowmobile, the safety shield being angled to deflect cleats thrown by the snowmobile to the ground.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a perspective view illustrating a snowmobile supported by a preferred embodiment of the snowmobile stand of this invention.

FIG. 2 is a perspective view of the snowmobile stand and support attachment of FIG. 1 from a different angle.

FIG. 3 is a perspective view of another embodiment of the snowmobile stand of this invention, illustrated supporting the rear of a snowmobile.

FIG. 4 is a side diagrammatic view of the snowmobile stand of this invention, illustrated supporting a snowmobile and showing by broken arrows the deflecting of thrown cleats.

FIG. 5 is a top plan view of the preferred embodiment illustrated in FIGS. 1 and 2.

FIG. 6 is a side plan view of the embodiment of FIG. 5.

FIG. 7 is a front plan view of the snowmobile stand illustrated in FIGS. 5 and 6.

DESCRIPTION OF THE PREFERRED EMBODIMENTS

FIG. 1 illustrates a snowmobile 10 supported by a snowmobile stand 11 according to this invention. Most snowmobiles include a body portion 12 supported at the front end by steerable runners 13. The body portion contains a motor which drives an endless belt or track 14 which extends under the majority of the snowmobile terminating adjacent the rear 15 with the track 14 being positioned to revolve around front 17 and rear 18 rollers. Additionally, most snowmobiles have towing hooks or attachment brackets 19 positioned on or adjacent to the rear 15. These brackets 19 are generally for the purpose of towing sleds or the like, but are, however, attached to the frame 12 in such a manner as to be capable of supporting much of the weight of the snowmobile. Therefore, they provide an opportune point for attachment of a lifting device or supporting member such as my snowmobile stand 11.

As better illustrated in FIG. 4, the track 14 oftentimes has a plurality of longitudinally spaced transversely extending cleats or gripping bars 20 attached thereto. A common method of attaching the cleats 20 is by means of rivets and commonly the cleats are merely bent pieces of metal having one portion riveted to the belt or track 14 and the other portion depending therefrom to engage the snow or other riding surface.

Inasmuch as it is oftentimes desirable to run the track 14 without movement of the snowmobile 10, it is necessary to elevate the track 14 off of the riding surface. When this is done, it is advantageous to have a support member capable of holding the rear end of the snowmobile stand in an elevated position. Such stands must be capable of supporting the weight of the snowmobile with a degree of safety. Further, such stands should be sufficiently light in weight to be transportable to the area where the snowmobile is likely to be used, and should have a sure footing whereby the stand can be used on uneven terrain. While many such devices might fulfill these requirements, additionally, due to the provision of the cleats 20, it is desirable if the stand have associated therewith some sort of safety means which would prevent injury to the operator or to bystanders in those instances when a cleat is thrown from the track. If the cleat is thrown from a portion of the track which is on top of the rollers 17 and 18 or the supporting rollers 21, then the cleat will be blocked by the body of the snowmobile itself. In those instances where the cleat is thrown as the track revolves around the front roller 17, the cleat will be thrown forward into the ground due to the angled nature of the snowmobile being supported by the stand. However, where the cleat is thrown from the track at any point between the front roller and the upper portion of the rear roller 18, it is possible for the cleat to be thrown backwards. Due to the elevated nature of the snowmobile at such times, such cleats can be extremely hazardous. It is not unknown for the tracks 14 to be revolving at a sufficient speed to propel the snowmobile in excess of 100 m.p.h. It is quite obvious that a cleat being thrown at that speed is capable of severely injuring anybody it may strike.

It is therefore extremely desirable that means be provided to prevent this. I have attached a shield 25 to my snowmobile stand, the shield being positioned behind the rear 15 of the snowmobile, and protecting the area into which such cleats would be thrown.

FIG. 3 illustrates a simple form of my invention, wherein the snowmobile stand 11 consists of a base member 26 to which is attached a pair of upright members 27 and 28, the upright members projecting above the base and terminating in cross-brace members 29 and 30 which connect the uprights. The cross-brace members have attached thereto a support hook 31, to which the snowmobile stand may be attached. A shield 33 is attached to the rear of the uprights 27 and 28. The shield illustrated in FIG. 3 is a rectangular piece of material, preferably metal, which is dimensioned to block the area to the rear of the snowmobile 10. The shield preferably extends from a point adjacent the lower cross member 30 to the base 26, and has a width approximately equal to the width of the base 26, the base having a width greater than the width of the track 14.

My preferred embodiment is clearly shown in FIGS. 5 through 7. The base member 26 consists of a ring constructed of L-shaped cross section angled metal having a base leg 50 with a vertical leg 51 formed as a piece of the base leg 50 at the inner radial end thereof. The base 26 preferably has a diameter greater than the width of the snowmobile.

The uprights 53 and 54 are preferably pieces of angled metal, L-shaped in cross section, and are attached to the base member 26 along a chordal line passing through the base ring. The line, such as the line 55, illustrated in FIG. 5, preferably cuts through the base portion at a depth from one-quarter to one-third of its diameter. The uprights 53 and 54 are preferably attached to both the vertical leg 51 and the base leg 50 of the base member 26 by means such as welding. The uprights 53 and 54 are angled with respect to the axis of the base, and project from the chordal line 55 towards the axis 56 of the base and upwardly therefrom to a height sufficient to support the snowmobile in an elevated position with the track 14 entirely off of the riding surface or ground. The free ends 57 and 58 of the uprights 53 and 54 terminate in spaced relation to one another and in a top view illustrated in FIG. 5, preferably just short of the axis. Cross members 59 and 60 are spaced apart vertically and interconnect to the uprights 53 and 54 with the cross member 59 at the free ends 57 and 58 of the uprights, and the cross member 60 spaced therebelow. The cross members 59 and 60 are preferably attached to the uprights by means such as welding. A U-shaped cross section support hook 70 having a long leg 71 and a short leg 72 interconnected by a bight section 73 is attached to the cross members. The long leg 71 is preferably welded to both of the cross members. In the preferred embodiment, the upper cross member 59 may be a cylinder while the lower cross member 60 is an L-shaped cross section piece of angled metal so that the corner between the bight 73 and the long leg 71 may be welded into the right degree angle of the cross member 60 with the support hook welded to both faces of the right angle. The free end 74 of the support hook may then be welded to the cross member 59. The bight section 73 of the support hook preferably has a length sufficient to receive and support the attachment member 19 of the snowmobile and further to extend over the axis 56 of the base member 26. In this manner, when the snowmobile is attached to the support hook, as illustrated in FIGS. 1, 2 and 4, the weight of the snowmobile at the point of attachment will lie approximately over the axis of the base. Because the base is a circular member, it will support the snowmobile on uneven terrain and the positioning of the support over the axis assures even placement of the weight of the snowmobile around the circumference of the base member to the extent permissible by the terrain.

In the preferred embodiment, the shield 80 is a piece of sheet metal. The sheet metal is attached to the base member 26 around the inner circumference of the vertical leg 51 and extends approximately 180° around the base with its mid-point perpendicular to the cross members 59, 60. In this manner, the shield 80 blocks half of the stand. The shield is preferably welded to the inner diameter of the vertical leg 51 and to the uprights 53 and 54 on the inside of the uprights closest to the axis. The shield has a curvature equivalent to a section of a cone with the point of the cone being approximately along the axis. Because the uprights are preferably angled from the base to form a cone with the apex along the axis, the shield 80 will attach to both of the uprights.

The shield extends vertically from the base to a point 82 spaced below the lower upright 60. The spacing between the top of the shield 82 and the dower cross member 60 is preferably minimal and in some instances, the shield may extend to the cross member 60.

The shield preferably has its outer edges 84 and 85 contoured as at 86 and 87 to provide clearance with the rear of the snowmobile as illustrated in FIG. 4.

After assembly of the stand in accordance with the above, the entire stand may be galvanized for long wear and rust-prevention.

As is illustrated by the dotted lines 90 and 91 in FIG. 4, because of the circumferential curvature of the shield 25–80 and the angle to the axis of the base, cleats thrown from the track 14 originally having a trajectory indicated by the line 90 will be deflected by the shield along the path indicated by the line 91 both downwardly towards the ground, backwardly towards the snowmobile and inwardly towards the axis of the base. Thus, the force of the moving cleat will be absorbed by the ground in an area of comparative safety underneath and adjacent the rear of the snowmobile. Additionally, any ricochet from the ground will normally be to the undersurface of the snowmobile away from the persons working on the snowmobile or standing in the vicinity.

It can be seen from the above that my preferred embodiment is different from the embodiment illustrated in FIG. 3, primarily in the curvature and angled placement of the shield. It is to be understood that the shield may be mounted to a support member other than that described, but that my preferred support member includes a circular base with at least two angled upright members supporting a support attachment such as the support hook, the shield being attached to both the circular base and to the uprights. The shield preferably has a width greater than the width of the track, and in most instances, greater than the width of the snowmobile.

Although my invention has herein been illustrated in connection with a support stand capable of supporting a single snowmobile, it is to be understood that the illustrated design may be modified to support two snowmobiles in opposed relation. For example, the uprights may be positioned along the diameter and support hooks could project from both sides of the cross members with a shield below and between the opposed support hooks. In this way, two snowmobiles can be supported from a single stand having the safety features and stability of the illustrated and designed single snowmobile support stand.

A support stand according to this invention is useful not only when repairing the snowmobile, but when displaying it in showrooms and when storing it. A snowmobile left inoperative over the summer months while resting on its track can adversely affect both the track and the support and driving rollers therefor. My invention provides a versatile, economical support stand for snowmobiles with a safety shield effective to deflect objects thrown from the snowmobile track.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A safety stand for snowmobiles comprising: a base ring portion, at least two uprights projecting from said base ring portion, said uprights having attached thereto and supporting a support member aligned adjacent to the center part of the base ring portion in spaced vertical relation from said base ring portion, a shield member angled with respect to the base ring portion and curved inwardly to deflect objects downwardly and toward the center thereof, the shield member constructed of a material having a strength sufficient to deflect a metal cleat thrown thereagainst from a cleated track of a snowmobile supported by the stand without rupturing the shield member, said shield member attached to said uprights, said shield member having a major portion thereof positioned behind said support member, and means on the support member for attachment to a snowmobile to hold a portion of the snowmobile in an elevated position.

2. The safety stand of claim 1 wherein said shield projects from the base ring portion and is angled and curved with respect thereto in the manner of a cone surface.

3. A support stand for snowmobiles comprising: a base member, said base member being ring-shaped, at least two upright members projecting from said base member, said upright members attached to the said base member along a chordal line, said upright members angled with respect to the said base member, said angle projecting inwardly towards the axis of the base member, a support member attached to said upright members remote from the said base member, said support member positioned to support a device adjacent to and vertically spaced from the axis of the base member, a metal shield member, said shield member attached to the said uprights, the support member including an attachment member attached thereto, the attachment member attachable to a portion of a snowmobile to maintain the portion in an elevated position with the support member and the attachment member supporting the portion of the snowmobile, the shield member attached to the uprights in a position where it will be located behind a snowmobile supported by the attachment member.

* * * * *